(12) United States Patent
Egi

(10) Patent No.: US 11,494,465 B2
(45) Date of Patent: Nov. 8, 2022

(54) COMMAND VALUE INTERPOLATION APPARATUS AND SERVO DRIVER

(71) Applicant: OMRON Corporation, Kyoto (JP)

(72) Inventor: Mamoru Egi, Otsu (JP)

(73) Assignee: OMRON Corporation, Kyoto (JP)

( * ) Notice: Subject to any disclaimer, the term of this patent is extended or adjusted under 35 U.S.C. 154(b) by 239 days.

(21) Appl. No.: 16/644,526

(22) PCT Filed: Nov. 2, 2018

(86) PCT No.: PCT/JP2018/040891
§ 371 (c)(1),
(2) Date: Mar. 5, 2020

(87) PCT Pub. No.: WO2019/093246
PCT Pub. Date: May 16, 2019

(65) Prior Publication Data
US 2020/0285689 A1    Sep. 10, 2020

(30) Foreign Application Priority Data

Nov. 9, 2017  (JP) .............................. JP2017-216317

(51) Int. Cl.
*G06F 17/17*     (2006.01)
(52) U.S. Cl.
CPC .................................. *G06F 17/175* (2013.01)
(58) Field of Classification Search
CPC ................. G06F 17/175; G06F 17/17; G05B 2219/39358; G05B 19/404; G05B 19/4103
See application file for complete search history.

(56) References Cited

U.S. PATENT DOCUMENTS 3,882,304 A * 5/1975 Walters ................... G06F 17/17
700/163
2013/0218323 A1   8/2013 Otsuki
(Continued)

FOREIGN PATENT DOCUMENTS

JP         2008-225825 A      9/2008
JP         2011-86099 A       4/2011
(Continued)

OTHER PUBLICATIONS

Erkorkmaz, "High speed CNC system design. Part I: jerk limited trajectory generation and quintic spline interpolation", International Journal of Machine Tools and Manufacture vol. 41, Issue 9, Jul. 2001, pp. 1323-1345 (Year: 2001).*

(Continued)

*Primary Examiner* — Chuong D Ngo
(74) *Attorney, Agent, or Firm* — Metrolex IP Law Group, PLLC

(57) ABSTRACT

Provided is an interpolation technique in which command values chronologically input can be interpolated without increasing a jerk and with less follow-up delay with respect to a command. A control unit (10) of a servo driver (20) has a function of sequentially generating, on the basis of four command values from x(k−2) to x(k+1), a kth interpolation function for calculating command values in a kth (≥3) time interval and a function of generating, as the kth interpolation function, a fifth-order equation with respect to time in which function values at a start time and an end time of the kth time interval match x(k) and x(k+1), respectively, and in which a second derivative value at a start time of the kth time interval matches a second derivative value at an end time of a (k−1)th time interval corresponding to a (k−1)th interpolation function.

8 Claims, 8 Drawing Sheets

(56) References Cited

U.S. PATENT DOCUMENTS

| | | |
|---|---|---|
| 2014/0117919 A1 | 5/2014 | Ikeda et al. |
| 2014/0195037 A1 | 7/2014 | Nishibashi |
| 2015/0025684 A1 | 1/2015 | Negishi |
| 2015/0148952 A1* | 5/2015 | Shiratsuchi ............ B25J 9/0084 700/248 |

FOREIGN PATENT DOCUMENTS

| | | |
|---|---|---|
| JP | 2013-30103 A | 2/2013 |
| JP | 2013-184245 A | 9/2013 |
| WO | 2014/064815 A1 | 5/2014 |

OTHER PUBLICATIONS

An English translation of the International Search Report("ISR") of PCT/JP2018/040891 dated Feb. 5, 2019.

An English translation of the Written Opinion("WO") of PCT/JP2018/040891 dated Feb. 5, 2019.

An extended European search report (EESR) dated Jun. 30, 2021 in a counterpart European patent application.

* cited by examiner

COMMAND VALUE

COMMAND VALUE

COMMAND VALUE INTERPOLATION APPARATUS AND SERVO DRIVER

TECHNICAL FIELD

The present invention relates to a command value interpolation apparatus and a servo driver.

BACKGROUND ART

To enable a smoother control operation of a numerically controlled machine tool, on the basis of a plurality of command values provided, interpolation functions for interpolating (calculating) command values between one command value and another are generated such that first derivatives and second derivatives are made continuous, and interpolation of command values are performed by using the generated interpolation functions (for example, refer to PTL 1).

CITATION LIST

Patent Literature

PTL 1: Japanese Patent Application Publication No. 2008-225825

SUMMARY OF INVENTION

Technical Problem

In a case where a plurality of command values subject to interpolation already exist, the number of command values needed for generating an interpolation function is not particularly limited. However, in a case where command values are sequentially input, the smaller the number of command values needed for generating an interpolation function is, the less follow-up delay with respect to a command based on each command value can be. Accordingly, in the case where the command values are sequentially input, it is preferable that the number of command values needed for generating an interpolation function be smaller. Also, to prevent a jerk (increasing acceleration) from increasing, even in the case where the command values are sequentially input, it is desirable that second derivatives of the respective interpolation functions be made continuous.

With the foregoing in view, it is an object of the present invention to provide an interpolation technique for interpolating command values that are chronologically input without increasing a jerk and with less follow-up delay with respect to a command.

Solution to Problem

To achieve the above object, in the present invention, a command value interpolation apparatus that interpolates a command value $x(k)$ sequentially input (k is an integer value indicating the order of input of the command value) at a predetermined cycle $t_s$ has a configuration including: interpolation function generation means for generating a kth interpolation function in which function values at a start time and an end time of a kth time interval match a command value $x(k)$ and a command value $x(k+1)$, respectively, for each k value of "1" or more in ascending order of k values; and interpolation means for repeating, in ascending order of k values, processing for calculating a plurality of command values in the kth time interval by using the kth interpolation function generated by the interpolation function generation means, wherein the interpolation function generation means is means for generating, on the basis of four command values from a command value $x(k-2)$ to a command value $x(k+1)$, the kth ($\geq 3$) interpolation function and also means for generating, as the kth ($\geq 3$) interpolation function, a fifth-order equation with respect to time in which function values at a start time and an end time of the kth time interval match a command value $x(k)$ and a command value $x(k+1)$, respectively, and in which a second derivative value at a start time of the kth time interval matches a second derivative value at an end time of a $(k-1)$th time interval corresponding to a $(k-1)$th interpolation function.

Namely, the interpolation function generation means of the command value interpolation apparatus in the present invention generates, when $k\geq 3$, a fifth-order equation with respect to time as a kth interpolation function for calculating command values in a kth command interval, on the basis of four command values from a command value $x(k-2)$ to a command value $x(k+1)$. In addition, the kth ($\geq 3$) interpolation function generated by the interpolation function generation means is a function in which function values at a start time and an end time of the kth time interval match a command value $x(k)$ and a command value $x(k+1)$, respectively, and in which a second derivative value at a start time of the kth time interval matches a second derivative value at an end time of a $(k-1)$th time interval corresponding to a $(k-1)$th interpolation function. Thus, by using each interpolation function generated by the interpolation function generation means, command values can be interpolated such that a jerk (increasing acceleration) is reduced. In addition, since the interpolation function generation means generates each interpolation function based on a few (four) command values, the command value interpolation apparatus according to the present invention can also reduce a follow-up delay with respect to a command based on each command value.

The effect of reducing the jerk is improved if first derivatives are also made continuous. Therefore, the command value interpolation apparatus of the present invention may adopt a configuration in which "the interpolation function generation means generates, as the kth ($\geq 3$) interpolation function, a fifth-order equation with respect to time in which function values at a start time and an end time of the kth time interval match a command value $x(k)$ and a command value $x(k+1)$, respectively, and in which a first derivative value and a second derivative value at a start time of the kth time interval match a first derivative value and a second derivative value at an end time of the $(k-1)$th time interval corresponding to the $(k-1)$th interpolation function, respectively". This configuration can be realized, for example, when the kth interpolation function is "a fifth-order equation with respect to an elapsed time t from a start time of a kth time interval, the fifth-order equation including $a_1$ to $a_6$ that satisfy an equation below as zero-order to fifth-order coefficients, respectively".

[Math. 1]

$$\begin{bmatrix} a_1 \\ a_2 \\ a_3 \\ a_4 \\ a_5 \\ a_6 \end{bmatrix} = \begin{bmatrix} 0 & 0 & 1 & 0 \\ \frac{1}{2t_s} & -\frac{4}{2t_s} & \frac{3}{2t_s} & 0 \\ \frac{1}{2t_s^2} & -\frac{2}{2t_s^2} & \frac{1}{2t_s^2} & 0 \\ -\frac{9}{2t_s^3} & \frac{27}{2t_s^3} & -\frac{27}{2t_s^3} & \frac{9}{2t_s^3} \\ \frac{11}{2t_s^4} & -\frac{33}{2t_s^4} & \frac{33}{2t_s^4} & -\frac{11}{2t_s^4} \\ -\frac{2}{t_s^5} & \frac{6}{t_s^5} & -\frac{6}{t_s^5} & \frac{2}{t_s^5} \end{bmatrix} \cdot \begin{bmatrix} x(k-2) \\ x(k-1) \\ x(k) \\ x(k+1) \end{bmatrix} \quad (1)$$

The command value interpolation apparatus of the present invention usually adopts a configuration in which "the interpolation function generation means performs generation processing for generating the kth (≥1) interpolation function when a command value x(k+1) has been input and the interpolation means starts processing for calculating command values in the kth time interval when the kth interpolation function has been generated". However, the command value interpolation apparatus of the present invention may adopt a configuration in which timing when the interpolation function generation means generates a kth interpolation function and timing when the interpolation means starts "processing for calculating command values in the kth time interval" are different from the above timing.

In addition, as the interpolation function generation means of the command value interpolation apparatus of the present invention, various means having a different specific procedure for generating a first interpolation function and a second interpolation function may be adopted. Specifically, for example, means that "generates a first interpolation function by the equation (1), assuming that values of x(−1) and x(0) are "3·x(1)−2·x(2)" and "2·x(1)−x(2)", respectively, and generates a second interpolation function by the equation (1), assuming that a value of x(0) is "2·x(1)−x(2)"", may be adopted as the interpolation function generation means. Alternatively, means that "generates a first interpolation function by the equation (1), assuming that values of x(−1) and x(0) are both x(1) and generates a second interpolation function by the equation (1), assuming that a value of x(0) is x(1)", may be adopted as the interpolation function generation means.

In addition, to be able to continue interpolation even when a certain command value is not input, the command value interpolation apparatus of the present invention may adopt a configuration in which, "in a case where a command value x(k+1) (k≥3) is not input at input timing at which the command value x(k+1) is supposed to be input, the interpolation means calculates command values in a kth time interval by using a (k−1)th interpolation function" and may also adopt a configuration in which, "in a case where a command value x(k+1) (k≥3) is not input at input timing at which the command value x(k+1) is supposed to be input, the interpolation function generation means estimates a command value x(k+1) by using a (k−1)th interpolation function and generates a kth interpolation function by using the estimated command value x(k+1)".

In addition, in the present invention, a servo driver that drives a servo motor on the basis of a command value x(k) sequentially input (k is an integer value indicating an order of input of the command value) at a predetermined cycle has a configuration including: a power circuit configured to drive the servo motor; interpolation function generation means for generating, upon input of a command value x(k+1) (k≥1), a kth interpolation function in which function values at a start time and an end time of a kth time interval match a command value x(k) and a command value x(k+1), respectively; interpolation means for calculating a plurality of command values in the kth time interval by using the kth interpolation function generated by the interpolation function generation means; and drive control means for controlling the power circuit on the basis of each command value calculated by the interpolation means, wherein the interpolation function generation means is means for generating, on the basis of four command values from a command value x(k−2) to a command value x(k+1), the kth (≥3) interpolation function and also means for generating, as the kth (≥3) interpolation function, a fifth-order equation with respect to time in which function values at a start time and an end time of the kth time interval match a command value x(k) and a command value x(k+1), respectively, and in which a second derivative value at a start time of the kth time interval matches a second derivative value at an end time of a (k−1)th time interval corresponding to a (k−1)th interpolation function.

Namely, as with the command value interpolation apparatus of the present invention, the servo driver of the present invention includes an interpolation function generation means for generating a kth interpolation function (a fifth-order equation with respect to time) for calculating command values in a kth (≥3) command interval, on the basis of four command values from a command value x(k−2) to a command value x(k+1). In addition, the kth (≥3) interpolation function generated by the interpolation function generation means is a function in which function values at a start time and an end time of the kth time interval match a command value x(k) and a command value x(k+1), respectively, and in which a second derivative value at a start time of the kth time interval matches a second derivative value at an end time of a (k−1)th time interval corresponding to a (k−1)th interpolation function. Thus, by using each interpolation function generated by the interpolation function generation means, command values can be interpolated such that a jerk (increasing acceleration) is reduced. In addition, since the interpolation function generation means generates each interpolation function on the basis of a few (four) command values, the servo driver according to the present invention can control the power circuit with less follow-up delay with respect to a command.

Advantageous Effects of Invention

According to the present invention, command values that are chronologically input can be interpolated without increasing a jerk and with less follow-up delay with respect to a command.

DESCRIPTION OF EMBODIMENTS

Hereinafter, an embodiment of the present invention will be described with reference to the drawings.

Figure 1:
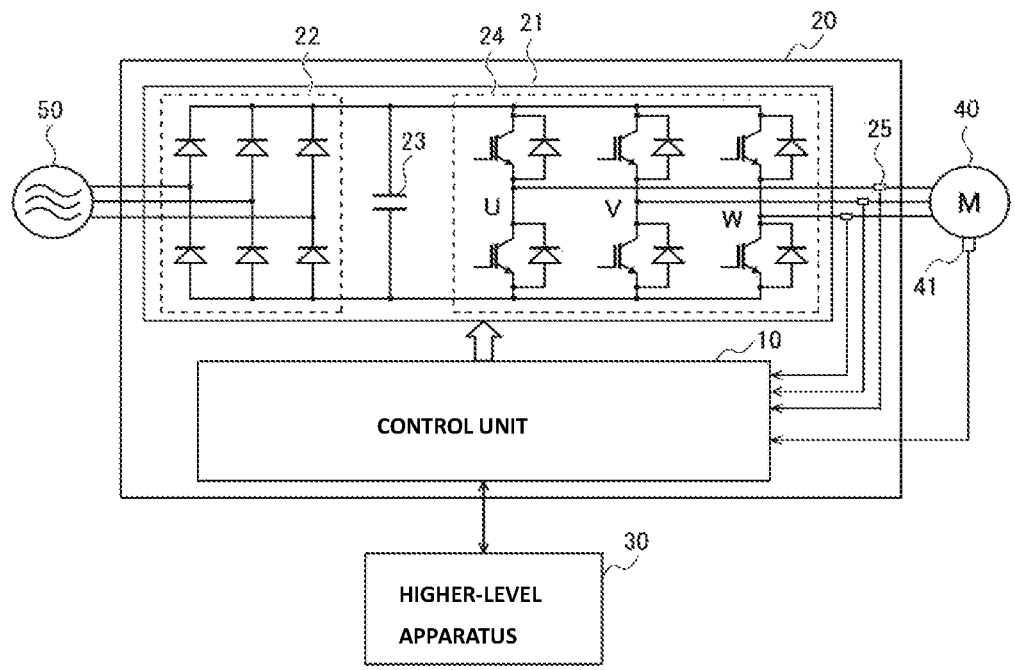
FIG. 1 is an explanatory diagram illustrating a schematic configuration and an application mode of a servo driver according to an embodiment of the present invention.

FIG. 1 illustrates a schematic configuration and an application mode of a servo driver 20 according to an embodiment of the present invention.

The servo driver 20 according to the present invention is an apparatus for driving a motor (a three-phase motor) 40. As illustrated in FIG. 1, the servo driver 20 includes a power circuit 21, a control unit 10, and a current sensor 25 for measuring an input/output current value of each leg of an inverter circuit 24 (which will be described in detail below) in the power circuit 21.

The power circuit 21 is a circuit for generating a three-phase alternating current supplied to the motor 40. The power circuit 21 includes a rectifier circuit 22 for rectifying a three-phase alternating current supplied from a three-phase power supply 50 and a smoothing capacitor 23. In addition, the power circuit 21 includes the inverter circuit 24 for converting voltage output from the rectifier circuit 22 and smoothed by the smoothing capacitor 23 into a three-phase alternating current.

The control unit 10 includes a processor, a flash ROM, a RAM, a gate driver, etc. As illustrated in FIG. 1, the control unit 10 receives a signal from each of the current sensors 25 and a signal from an encoder 41 (such as an absolute encoder or an incremental encoder) mounted on the motor 40.

In addition, the flash ROM in the control unit 10 stores a program developed for the servo driver 20. The control unit 10 operates as a unit having various kinds of functions, which will be described below, by causing the processor to read the program into the RAM and execute the read program.

Hereinafter, the functions of the control unit 10 will be described.

The control unit 10 is a unit that basically controls the inverter circuit 24 in accordance with a command value (a current command value in the present embodiment) periodically input from a higher-level apparatus 30 such as a PLC (Programmable logic controller) at a predetermined cycle $t_s$ (for example, 4 ms). Hereinafter, a kth command value (k≥1; the head command value is the first command value) from the higher-level apparatus 30 is represented by x(k). In addition, a time interval from a time when a kth command value is input to a time when a (k+1)th command value is input and a time interval from a time when a kth command value is output to a time when a (k+1)th command value is output will be referred to as a kth command interval.

Figure 2:
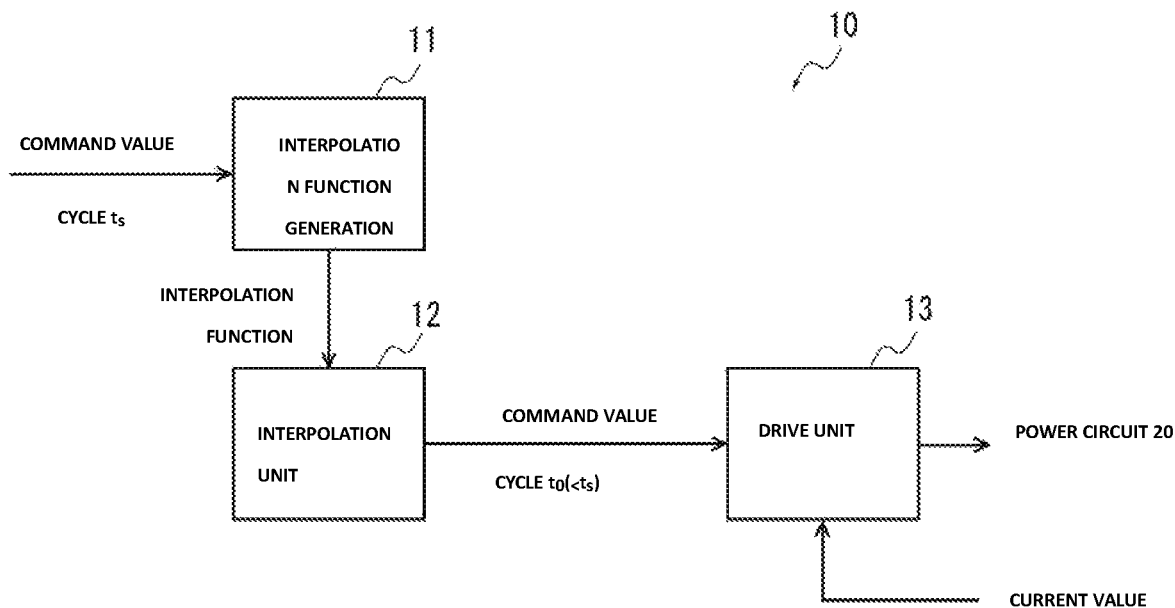
FIG. 2 is a functional block diagram of a control unit included in a servo driver according to an embodiment.

FIG. 2 illustrates a functional block diagram of the control unit 10. As illustrate in FIG. 2, the control unit 10 operates as an interpolation function generation unit 11, an interpolation unit 12, and a drive unit 13.

The interpolation function generation unit 11 is a unit (a functional block) that generates an interpolation function for a command interval per command interval. The interpolation function generation unit 11 generates a fifth-order equation with respect to time t as an interpolation function $y_k(t)$ for a kth (≥1) command interval, which will be described in detail below.

$$y_k(t)=a_1+a_2t+a_3t^2+a_4t^3+a_5t^4+a_6t^5$$

Figure 3:
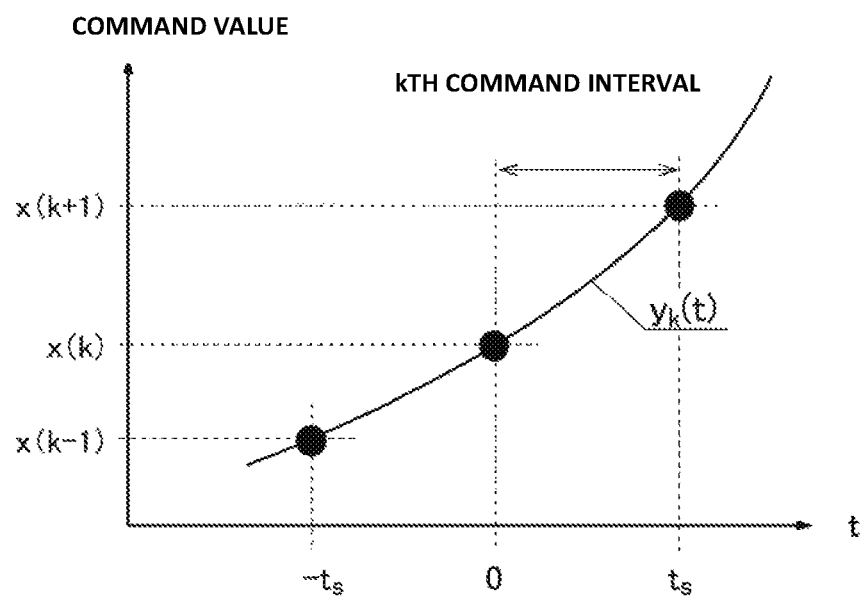
FIG. 3 is a diagram that describes an interpolation function $y_k(t)$.

As schematically illustrated in FIG. 3, t in this fifth-order equation represents an elapsed time from a start time (a time of the start) of the kth command interval. Namely, if a time in a kth time interval for which a command value (an interpolation value of a command value) needs to be calculated is represented by $t_{tgt}$ and if a start time of the kth command interval is represented by $t_k$, a command value at the time $t_{tgt}$ is calculated by substituting "$t_{tgt}-t_k$" into t in the above fifth-order equation.

The interpolation unit 12 (FIG. 2) is a unit that basically repeats calculation of a command value by the latest interpolation function generated by the interpolation function generation unit 11 at a cycle $t_o$ (for example, 0.125 ms) shorter than the cycle $t_s$. The interpolation unit 12 also has a function (which will be described below) of calculating command values in the kth command interval, on the basis of an interpolation equation $y_{k-1}(t)$ for a (k−1)th command interval.

The drive unit 13 is a unit that controls the inverter circuit 24 such that a current value from each of the sensors 25 becomes a value that corresponds to the command value calculated by the interpolation unit 12.

Hereinafter, the functions of the control unit 10 will be described more specifically.

Figure 4:
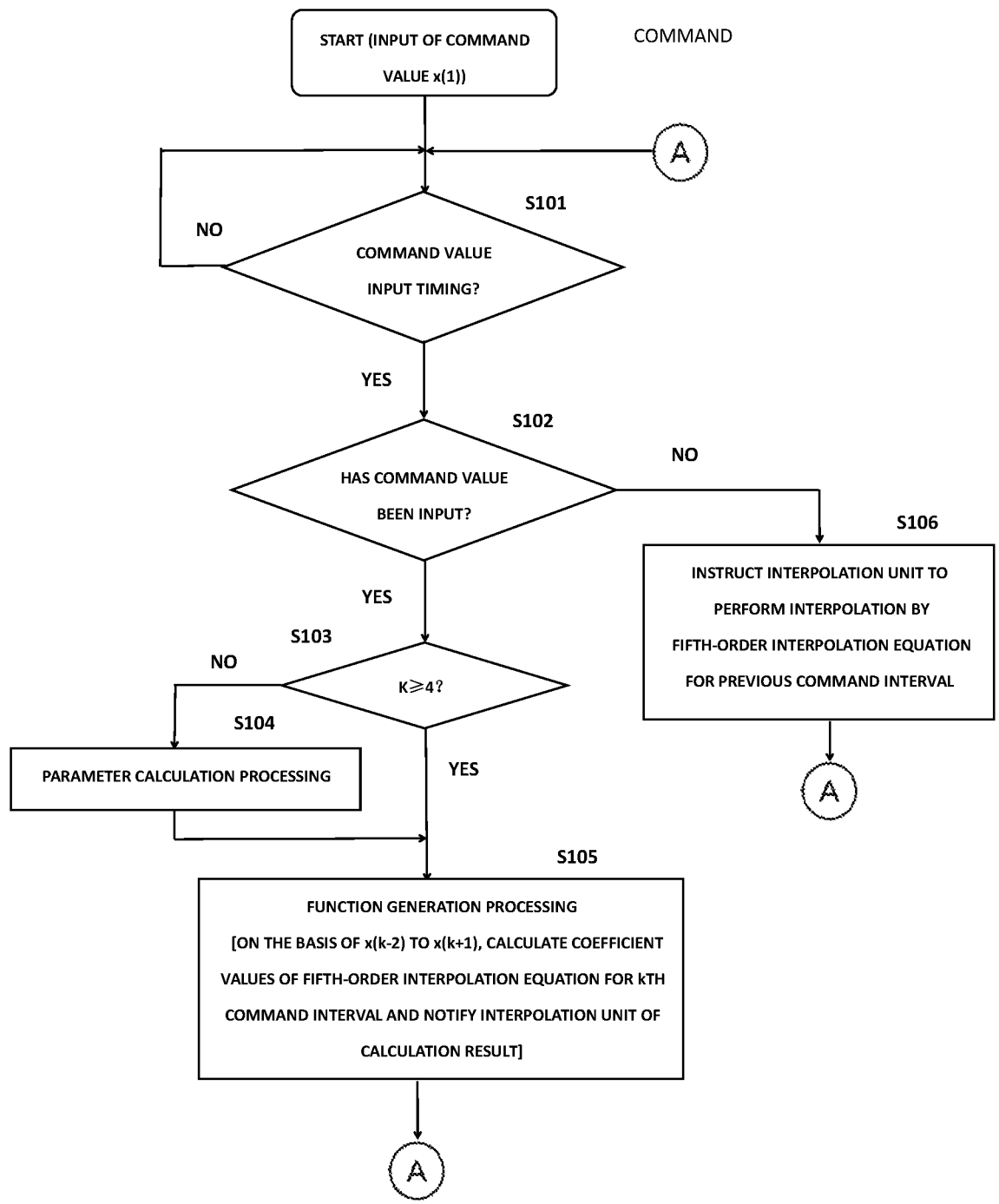
FIG. 4 is a flowchart illustrating interpolation function generation processing performed by an interpolation function generation unit in the control unit.

When the first (initial) command value x(1) is input, the interpolation function generation unit 11 in the control unit 10 starts interpolation function generation processing according to procedures illustrated in FIG. 4. In FIG. 4 and the descriptions below, k represents a variable whose initial value is "1" and that is incremented by "1" every time a branch toward the "YES" side is made in processing (determination) in step S101.

Namely, having started this interpolation function generation processing upon the input of the command value x(1), first, in step S101, the interpolation function generation unit 11 waits for an input timing of the next command value. In other words, the interpolation function generation unit 11 waits until a command-value input cycle $t_s$ has elapsed from the input time of the current command value.

When the input timing of the command value has come (step S101; YES), the interpolation function generation unit 11 determines whether the command value has been input (step S102). If the command value has been input (step S102; YES), the interpolation function generation unit 11 determines whether the k value is four or more (whether the command value currently input is a fourth or subsequent command value) (step S103).

If the k value is less than four (step S103; NO), namely, if the command value currently input is a second or a third command value, the interpolation function generation unit 11 performs parameter calculation processing (step S104) and then performs function generation processing (step S105). In contrast, if the command value currently input is the fourth or subsequent command value (step S103; YES), the interpolation function generation unit 11 performs the function generation processing (step S105) without performing the parameter calculation processing.

The function generation processing is processing for calculating coefficients $a_1$ to $a_6$ of an interpolation function for the kth command interval "$y_k(t)=a_1+a_2t+a_3t^2+a_4t^3+a_5t^4+a_6t^5$" by the following equation (1) and notifying the interpolation unit 12 of the calculation result.

[Math. 2]

$$\begin{bmatrix} a_1 \\ a_2 \\ a_3 \\ a_4 \\ a_5 \\ a_6 \end{bmatrix} = \begin{bmatrix} 0 & 0 & 1 & 0 \\ \frac{1}{2t_s} & -\frac{4}{2t_s} & \frac{3}{2t_s} & 0 \\ \frac{1}{2t_s^2} & -\frac{2}{2t_s^2} & \frac{1}{2t_s^2} & 0 \\ -\frac{9}{2t_s^3} & \frac{27}{2t_s^3} & -\frac{27}{2t_s^3} & \frac{9}{2t_s^3} \\ \frac{11}{2t_s^4} & -\frac{33}{2t_s^4} & \frac{33}{2t_s^4} & -\frac{11}{2t_s^4} \\ -\frac{2}{t_s^5} & \frac{6}{t_s^5} & -\frac{6}{t_s^5} & \frac{2}{t_s^5} \end{bmatrix} \cdot \begin{bmatrix} x(k-2) \\ x(k-1) \\ x(k) \\ x(k+1) \end{bmatrix} \quad (1)$$

Hereinafter, a procedure of deriving equation (1) will be described. In the following description, an nth derivative of a function $f$ ($y_k(t)$, etc.) is represented by $f^{(n)}$.

The above equation (1) is obtained as a result of intensive studies on a method for generating a function for command-value interpolation in which first derivatives and second derivatives are made continuous at an interval boundary.

Specifically, an interpolation function in which function values at a command interval boundary match command values and in which first derivatives and second derivatives at the command interval boundary are made continuous needs to satisfy six boundary conditions. Thus, by using the following equation (2) (fifth-order equation with respect to time t) including six coefficients, the interpolation function in which function values at a command interval boundary match command values and in which first derivatives and second derivatives at the command interval boundary are made continuous can be obtained.

[Math. 3]

$$y_k(t) = a_1 + a_2 t + a_3 t^2 + a_4 t^3 + a_5 t^4 + a_6 t^5 \quad (2)$$

To determine the six coefficients in equation (2), six command values are needed in principle. However, if a large number of command values are needed for calculating values of coefficients $a_1$ to $a_6$, a follow-up delay with respect to a command increases. Accordingly, to reduce the follow-up delay with respect to the command, when the above equation (1) is developed, first derivative values and second derivative values at each interval boundary (a start time "0", an end time "$t_s$") of the kth command interval corresponding to the kth interpolation function are approximated by the following equations (3) to (6).

[Math. 4]

$$y_k^{(1)}(t_s) = \frac{x(k-1) - 4x(k) + 3x(k+1)}{2t_s} \quad (3)$$

$$y_k^{(2)}(t_s) = \frac{x(k-1) - 2x(k) + x(k+1)}{t_s^2} \quad (4)$$

$$y_k^{(1)}(0) = \frac{x(k-2) - 4x(k-1) + 3x(k)}{2t_s} \quad (5)$$

$$y_k^{(2)}(0) = \frac{x(k-2) - 2x(k-1) + x(k)}{t_s^2} \quad (6)$$

Equation (3) is an approximate equation of a first derivative value at an end time of the kth command interval corresponding to the kth interpolation function. Equation (4) is an approximate equation of a second derivative value at an end time of the kth command interval corresponding to the kth interpolation function. These equations are derived by performing Taylor expansion or the like on equation (2).

Specifically, by performing the Taylor expansion on equation (2) around a point $t_s$, the following equation (7) is obtained.

[Math. 5]

$$y_k(t) = \sum_{n=0}^{\infty} \frac{y_k^{(n)}(t_s)}{n!} \cdot (t - t_s)^n \quad (7)$$

If each term of the third order or higher of "t-$t_s$" on the right side of equation (7) is ignored (regarded as "0"), the following equation (8) is obtained.

[Math. 6]

$$y_k(t) = y_k(t_s) + y_k^{(1)}(t_s) \cdot (t - t_s) + \frac{1}{2!} y_k^{(2)}(t_s) \cdot (t - t_s)^2 \quad (8)$$

If $-t_s$ and 0 are substituted into t in equation (8), the following equations (9) and (10) are obtained, respectively.

[Math. 7]

$$y_k(-t_s) = y_k(t_s) + y_k^{(1)}(t_s) \cdot (-2t_s) + \frac{1}{2!} y_k^{(2)}(t_s) \cdot (-2t_s)^2 \quad (9)$$

$$y_k(0) = y_k(t_s) + y_k^{(1)}(t_s) \cdot (-t_s) + \frac{1}{2!} y_k^{(2)}(t_s) \cdot (-t_s)^2 \quad (10)$$

If these equations are solved as simultaneous equations of $y_k^{(1)}(t_s)$ and $y_k^{(2)}(t_s)$, the following equations (11) and (12) are obtained, respectively.

[Math. 8]

$$y_k^{(1)}(t_s) = \frac{y_k(-t_s) - 4y_k(0) + 3y_k(t_s)}{2t_s} \quad (11)$$

$$y_k^{(2)}(t_s) = \frac{y_k(-t_s) - 2y_k(t_s) + y_k(t_s)}{t_s^2} \quad (12)$$

Equation (3) above is obtained by changing the right side of equation (11) to an equation of x by using relational equations $y_k(-t_s) = x(k-1)$, $y_k(0) = x(k)$, and $y_k(t_s) = x(k+1)$, and equation (4) above is obtained by changing the right side of equation (12) to an equation of x by using the same relational equations as the above.

Equations (5) and (6) above are approximate equations of a first derivative value and a second derivative value, respectively, at a start time of the kth command interval corresponding to the kth interpolation function. These equations are derived by the following procedure.

The kth interpolation function to be obtained is a function in which the first and second derivative values at the start time of the kth command interval match first and second derivative values at an end time (=the start time of the kth command interval) of a (k−1)th command interval corresponding to a (k−1)th interpolation function, respectively. Thus, the kth interpolation function needs to satisfy the following two conditions.

[Math. 9]

$$y_{k-1}^{(1)}(t_s) = y_k^{(1)}(0) \quad (13)$$

$$y_{k-1}^{(2)}(t_s) = y_k^{(2)}(0) \quad (14)$$

By substituting "k−1" into "k" in equations (3) and (4) above, the following equations (15) and (16) can be obtained, respectively.

[Math. 10]

$$y_{k-1}^{(1)}(t_s) = \frac{x(k-2) - 4x(k-1) + 3x(k)}{2t_s} \quad (15)$$

$$y_{k-1}^{(2)}(t_s) = \frac{x(k-2) - 2x(k-1) + x(k)}{t_s^2} \quad (16)$$

Next, by changing equation (15) by using equation (13), equation (5) is obtained, and by changing equation (16) by using equation (14), equation (6) is obtained. Thus, by satisfying equations (5) and (6), the kth interpolation function in which the first and second derivative values at the start time of the kth command interval match the first and second derivative values at the end time (=the start time of the kth command interval) of the (k−1)th command interval corresponding to the (k−1)th interpolation function, respectively, can be obtained.

As described above, equations (3) and (4) can be used as approximate equations of the first derivative value and the second derivative value, respectively, at the end time of the kth command interval corresponding to the kth interpolation function. In addition, equation (5) can be used as an approximate equation of the first derivative value at the start time of the kth command interval corresponding to the kth interpolation function and a conditional equation of continuity of the first derivative value at the start time of the kth command interval corresponding to the kth interpolation function. Further, equation (6) can be used an approximate equation of the second derivative value at the start time of the kth command interval corresponding to the kth interpolation function and a conditional equation of continuity of the second derivative value at the start time of the kth command interval corresponding to the kth interpolation function. Consequently, since $y_k(0) = x(k)$ and $y_k(t_s) = x(k+1)$, the following equation (17) holds true.

[Math. 11]

$$\begin{bmatrix} y_k(0) \\ y_k^{(1)}(0) \\ y_k^{(1)}(0) \\ y_k(t_s) \\ y_k^{(1)}(t_s) \\ y_k^{(1)}(t_s) \end{bmatrix} = \begin{bmatrix} 0 & 0 & 1 & 0 \\ -\frac{1}{2t_s} & -\frac{4}{2t_s} & \frac{3}{2t_s} & 0 \\ \frac{1}{t_s^2} & -\frac{2}{t_s^2} & \frac{1}{t_s^2} & 0 \\ 0 & 0 & 0 & 1 \\ 0 & \frac{1}{2t_s} & -\frac{4}{2t_s} & \frac{3}{2t_s} \\ 0 & \frac{1}{t_s^2} & -\frac{2}{t_s^2} & \frac{1}{t_s^2} \end{bmatrix} \cdot \begin{bmatrix} x(k-2) \\ x(k-1) \\ x(k) \\ x(k+1) \end{bmatrix} \quad (17)$$

Namely, as described below, if matrices $Y_d$, $K_X$, and $X$ are defined, $Y_d = K_X \cdot X$ holds true.

[Math. 12]

$$Y_d = \begin{bmatrix} y_k(0) \\ y_k^{(1)}(0) \\ y_k^{(1)}(0) \\ y_k(t_s) \\ y_k^{(1)}(t_s) \\ y_k^{(1)}(t_s) \end{bmatrix}$$

$$K_X = \begin{bmatrix} 0 & 0 & 1 & 0 \\ -\frac{1}{2t_s} & -\frac{4}{2t_s} & \frac{3}{2t_s} & 0 \\ \frac{1}{t_s^2} & -\frac{2}{t_s^2} & \frac{1}{t_s^2} & 0 \\ 0 & 0 & 0 & 1 \\ 0 & \frac{1}{2t_s} & -\frac{4}{2t_s} & \frac{3}{2t_s} \\ 0 & \frac{1}{t_s^2} & -\frac{2}{t_s^2} & \frac{1}{t_s^2} \end{bmatrix}$$

$$X = \begin{bmatrix} x(k-2) \\ x(k-1) \\ x(k) \\ x(k+1) \end{bmatrix}$$

In addition, by differentiating both sides of equation (1) (the fifth-order equation with respect to t) by t, the following equation (18) can be obtained, and by differentiating both sides of equation (18) by t, the following equation (19) can be obtained.

[Math. 13]

$$y_k^{(1)}(t) = a_2 + 2a_3 t + 3a_4 t^2 + 4a_5 t^3 + 5a_6 t^4 \quad (18)$$

$$y_k^{(2)}(t) = 2a_3 + 6a_4 t + 12a_5 t^2 + 20a_6 t^3 \quad (19)$$

Further, $y_k(0) = a_1$ is obtained from equation (1), and $y_k^{(1)}(0) = a_2$ and $y_k^{(2)}(0) = 2a_3$ are obtained from equation (18) and equation (19), respectively.

Thus, the following equation (20) holds true.

[Math. 14]

$$\begin{bmatrix} y_k(0) \\ y_k^{(1)}(0) \\ y_k^{(1)}(0) \\ y_k(t_s) \\ y_k^{(1)}(t_s) \\ y_k^{(1)}(t_s) \end{bmatrix} = \begin{bmatrix} 1 & 0 & 0 & 0 & 0 & 0 \\ 0 & 1 & 0 & 0 & 0 & 0 \\ 0 & 0 & 2 & 0 & 0 & 0 \\ 1 & t_s & t_s^2 & t_s^3 & t_s^4 & t_s^5 \\ 0 & 1 & 2t_s & 3t_s^2 & 4t_s^3 & 5t_s^4 \\ 0 & 0 & 2 & 6t_s & 12t_s^2 & 20t_s^3 \end{bmatrix} \cdot \begin{bmatrix} a_1 \\ a_2 \\ a_3 \\ a_4 \\ a_5 \\ a_6 \end{bmatrix} \quad (20)$$

If a 6×6 matrix and a 6×1 matrix on the right side of this equation (20) are represented by $K_A$ and A, respectively, $Y_d = K_A \cdot A$ holds true. However, $Y_d = K_X \cdot X$ holds true as already described above (see equation (17)).

Since the elements $K_X$, $K_A$, and X are all known values, A can be obtained by $K_A^{-1} \cdot K_X \cdot X$. If $K_A^{-1} \cdot K_X$ is actually calculated to obtain A, the following matrix is obtained.

[Math. 15]

$$K_A^{-1} * K_X = \begin{bmatrix} 0 & 0 & 1 & 3 \\ \frac{1}{2t_s} & -\frac{4}{2t_s} & \frac{3}{2t_s} & 0 \\ \frac{1}{2t_s^2} & -\frac{2}{2t_s^2} & \frac{1}{2t_s^2} & 0 \\ -\frac{9}{2t_s^3} & \frac{27}{2t_s^3} & -\frac{27}{2t_s^3} & \frac{9}{2t_s^3} \\ \frac{11}{2t_s^4} & -\frac{33}{2t_s^4} & \frac{33}{2t_s^4} & -\frac{11}{2t_s^4} \\ -\frac{2}{t_s^5} & \frac{6}{t_s^5} & -\frac{6}{t_s^5} & \frac{2}{t_s^5} \end{bmatrix}$$

Thus, A ($a_1$ to $a_6$) can be calculated by equation (1) described above.

Referring back to FIG. 4, the description will be continued.

As is apparent from the above description, function generation processing originally needs four command values continuously input. However, in a case where the function generation processing is performed in such a manner, until the fourth command value is input, the control of the power circuit 21 (the drive control of the motor 40) cannot be started.

Processing prepared for starting the control of the power circuit 21 when the second command value is input is parameter calculation processing in step S104.

Specifically, the function generation processing with the above contents can be executed when four consecutive command values are obtained. Accordingly, if the function generation processing is performed by calculating (estimating) a command value $x(-1)$ and a command value $x(0)$ when a first interpolation function is generated, and if the function generation processing is performed by calculating a command value $x(0)$ when a second interpolation function is generated, the control of the power circuit 21 can be started when the second command value is input. The command value $x(-1)$ is an estimated value of a command value of two values before the command value $x(1)$. The command value $x(0)$ is an estimated value of a command value immediately before the command value $x(1)$.

However, if the command value $x(-1)$ and the command value $x(0)$ are not proper values, undesirable control will be performed on the power circuit 21. To avoid such a fault occurrence, in step S104, parameter calculation processing for calculating the command values $x(-1)$ and $x(0)$ or the command value $x(0)$ is performed on the basis of command values that have already been input.

Hereinafter, a specific example of the parameter calculation processing will be described.

As the parameter calculation processing, processing in which, when k=2, $x(-1)$ and $x(0)$ are calculated (estimated) by the following equations (21) and (22) and when k=3, $x(0)$ is calculated by the following equation (22) can be adopted.

$$x(-1)=3 \cdot x(1)-2 \cdot x(2) \quad (21)$$

$$x(0)=2 \cdot x(1)-x(2) \quad (22)$$

Figure 5:
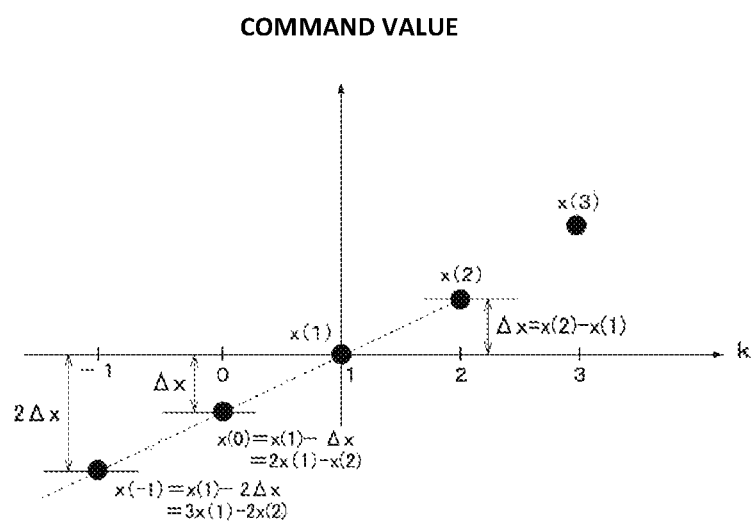
FIG. 5 is an explanatory diagram of a specific example of parameter calculation processing.

Namely, in this parameter calculation processing, as schematically illustrated in FIG. 5, $x(-1)$ and $x(0)$, or $x(0)$ are calculated, assuming that a change rate of the command value is constant.

Figure 6:
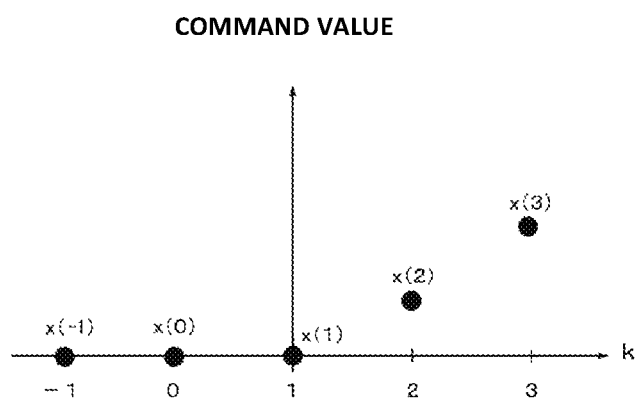
FIG. 6 is an explanatory diagram of another specific example of parameter calculation processing.

Alternatively, as schematically illustrated in FIG. 6, processing in which, when k=2, $x(-1)$ and $x(0)$ are calculated by the same value as the command value $x(1)$ and when k=3, $x(0)$ is calculated by the same value as the command value $x(1)$ can also be adopted as the parameter calculation processing.

Figure 7:
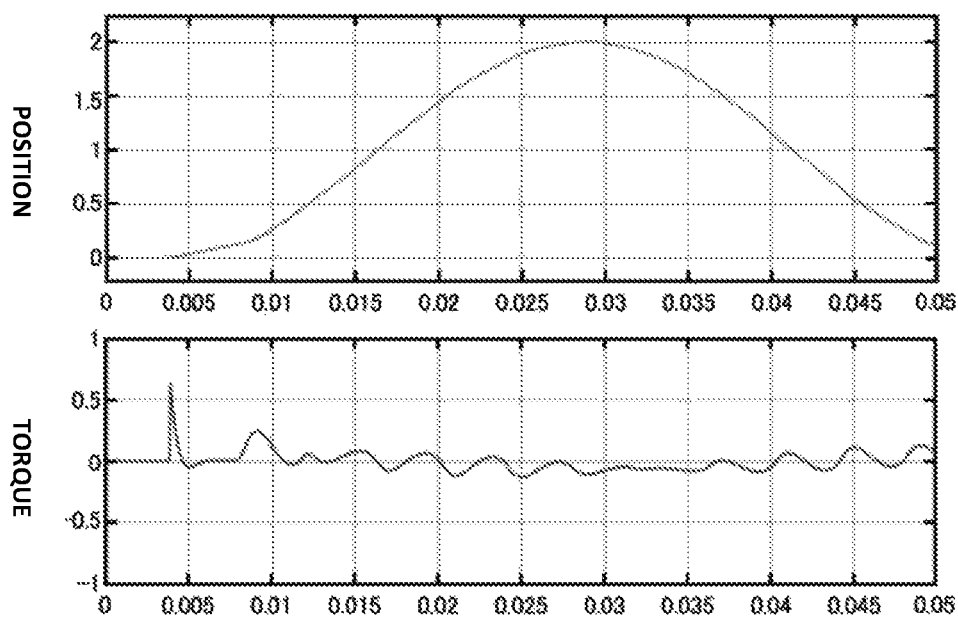
FIG. 7 is an explanatory diagram illustrating a position of a motor and a time change pattern of torque in a case where the parameter calculation processing in FIG. 5 is adopted.

In a case where the former parameter calculation processing (FIG. 5) is adopted, the position of the motor 40 and torque change as illustrated in FIG. 7. In a case where the latter parameter calculation processing (FIG. 6) is adopted, the position of the motor 40 and torque change as illustrated in FIG. 8.

Figure 8:
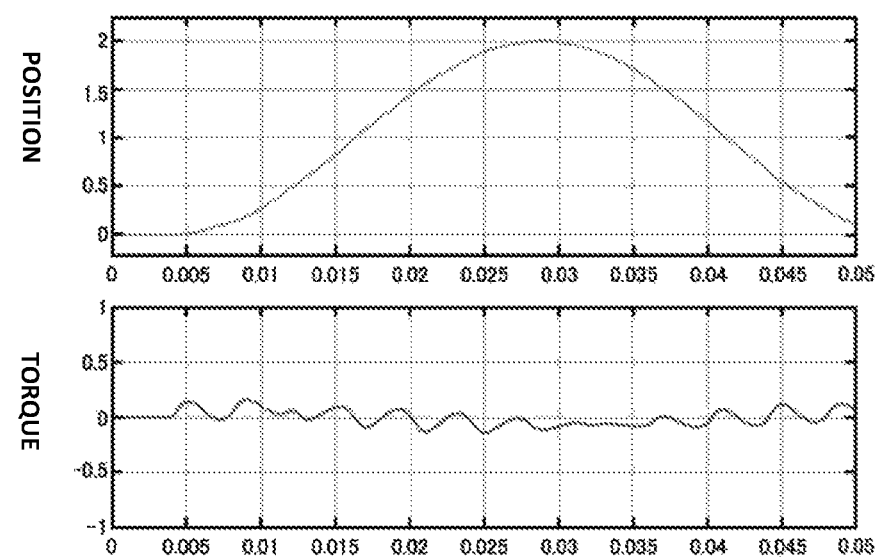
FIG. 8 is an explanatory diagram illustrating a position of a motor and a time change pattern of torque in a case where the parameter calculation processing in FIG. 6 is adopted.

Namely, trajectory reproducibility can be more improved by adopting the former parameter calculation processing in which the command values $x(-1)$ and $x(0)$ are calculated assuming the constant change rate (FIG. 7) than adopting the latter parameter calculation processing in which the command values $x(-1)$ and $x(0)$ are the same value as $x(1)$ (FIG. 8). However, the peak of the torque at an operation starting point can be made smaller by adopting the latter parameter calculation processing (FIG. 8) than adopting the former parameter calculation processing (FIG. 7). Thus, when the peak of the torque at the operation starting point needs to be made smaller, the former parameter calculation processing may be performed, and when good trajectory reproducibility needs to be obtained, the latter parameter calculation processing may be performed.

Referring back to FIG. 4, the description will be continued.

After the interpolation function generation unit 11 finishes the function generation processing, the processing returns to step S101, and the interpolation function generation unit 11 waits for an input timing of the next command value.

Normally, the interpolation function generation unit 11 repeats the above processing. However, if the command value is not input even though the input timing of the command value has come (step S102; NO), the interpolation function generation unit 11 instructs the interpolation unit 12 to perform interpolation by a fifth-order interpolation equation for the previous command interval (steps S106).

Figure 9:
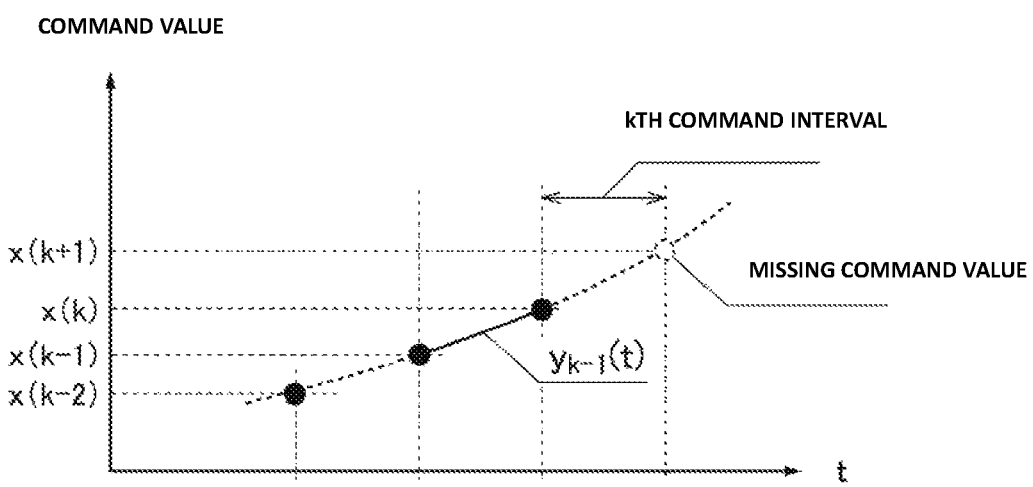
FIG. 9 is an explanatory diagram illustrating processing in step S106 in interpolation function generation processing.

Namely, command values input from the higher-level apparatus 30 normally change smoothly over time. Thus, as schematically illustrated in FIG. 9, the interpolation in the kth command interval from a (k−1)th command value to a kth command value that has not been input (a missing command value in FIG. 9) can be performed by a fifth-order interpolation equation $y_{k-1}(t)$ for a (k−1)th command interval. In the fifth-order interpolation equation $y_{k-1}(t)$ for the (k−1)th command interval, t represents an elapsed time from a start time $t_{k-1}$ of the (k−1)th command interval. Therefore, if the elapsed time from the start time of the kth time interval including a time $t_{tgt}$ for which a command value needs to be calculated is represented by $\Delta t$, the interpolation unit 12, which has received the instruction based on the processing in step S106, calculates the command value at the time $t_{tgt}$ by substituting "$t_s + \Delta t$" into t of $y_{k-1}(t)$.

As described above, on the basis of four command values from a command value $x(k-2)$ to a command value $x(k+1)$, the control unit 10 of the servo driver 20 according to the present embodiment generates a kth interpolation function (a fifth-order equation with respect to time) for calculating command values in a kth command interval from a command value $x(k)$ to a command value $x(k+1)$. In addition, the kth interpolation function generated by the control unit 10 is a function in which function values at a start time and an end time of the kth time interval match a command value $x(k)$ and a command value $x(k+1)$, respectively, and in which a first derivative value and a second derivative value at the start time of the kth time interval match a first derivative value and a second derivative value at an end time of a (k−1)th time interval corresponding to a (k−1)th interpolation function. Thus, by using the interpolation function generated by the control unit 10, the command value can be interpolated with excellent followability to an original trajectory (a time change pattern of the command value subject to interpolation) and without increasing a jerk (increasing acceleration).

Figure 10:
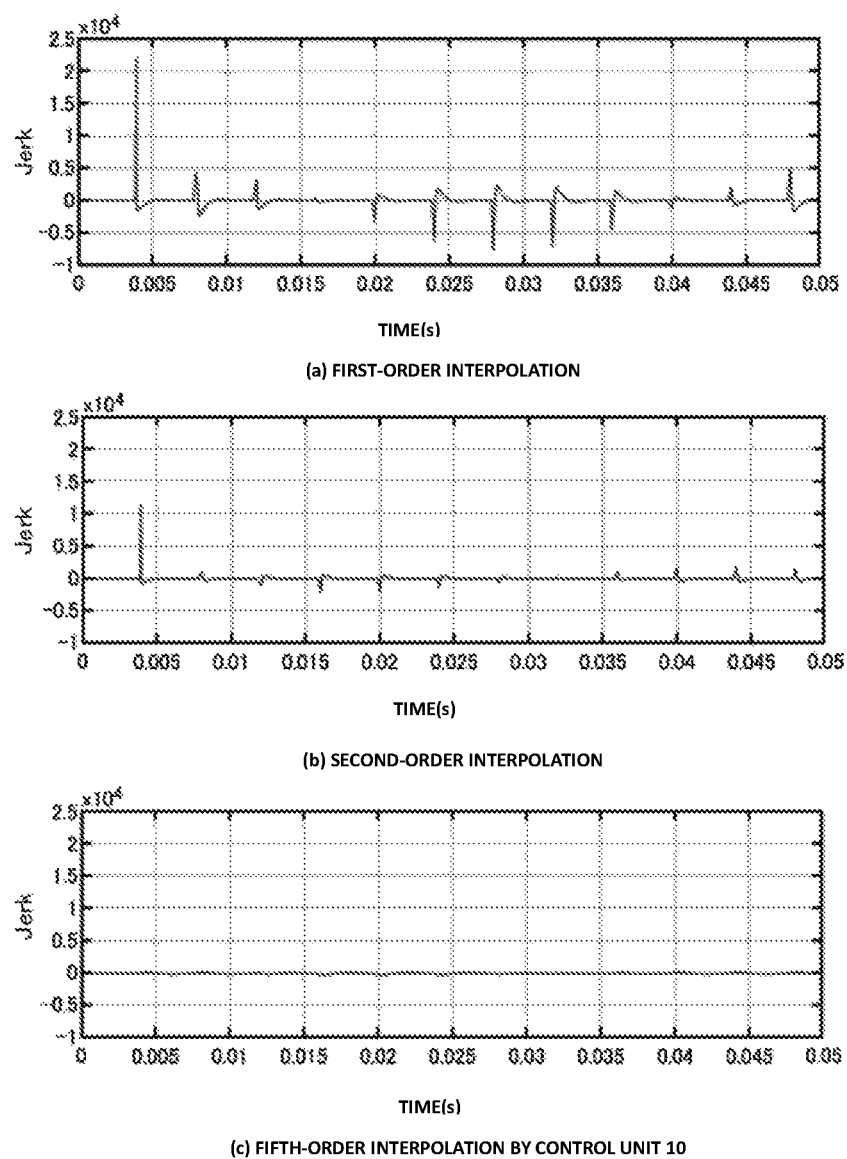
FIG. 10 is an explanatory diagram illustrating results of simulations of jerk values in cases where first-order interpolation, second-order interpolation, and fifth-order interpolation by a control unit are performed on the same input.

Specifically, FIG. 10 illustrates simulation results of jerk values in respective cases where first-order interpolation, second-order interpolation, and fifth-order interpolation by the control unit 10 are performed on the same inputs (a group of the same command values). As illustrated in FIG. 10, in the case where the first-order interpolation is performed (FIG. 10(a)), a relatively large jerk occurs at every input of the command value. Also, in the case where the second interpolation is performed (FIG. 10(b)), a relatively large jerk occurs at every input of the command value. In contrast, in the case where the fifth-order interpolation by the control unit 10 is performed, as illustrated in FIG. 10(c), jerk values can be reduced to extremely small values.

Figure 11:
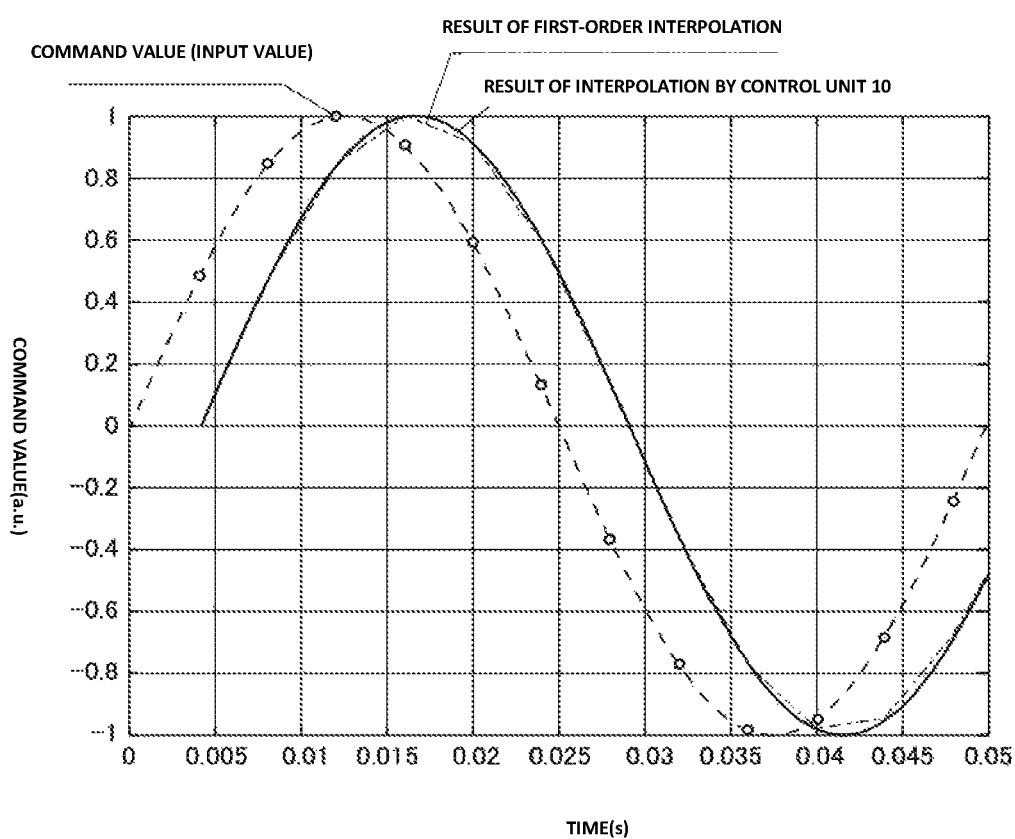
FIG. 11 is an explanatory diagram illustrating a result of interpolation performed by a control unit of a servo driver according to an embodiment.

In addition, the control unit 10 has a function of generating a first interpolation function and a second interpolation function even when all the four command values cannot be obtained by using an estimated value such as a command value x(0), etc. Thus, with the servo driver 20 (the control unit 10) according to the present embodiment, as illustrated in FIG. 11, as is the first-order interpolation, interpolation of the command value can be started at the time of input of the second command value.

<<Variations>>

Various modifications can be made to the servo driver 20 (the control unit 10) according to the above embodiment. For example, an apparatus that corrects command values other than the command values for the motor 40 may be manufactured on the basis of the above technique. In addition, in a case where the command value is not input at the input timing of the command value (step S102; NO), the interpolation function generation processing (FIG. 4) may be modified to processing in which, after x(k+1) is calculated (estimated) by substituting $2t_s$ into t of the fifth-order interpolation equation $y_{k-1}(t)$ for the (k−1)th command interval, the processing in step S105 is performed.

If the second derivatives are made continuous (if the second derivative value at the start time of the kth time interval matches the second derivative value at the end time of the (k−1)th time interval corresponding to the (k−1)th interpolation function), even if the first derivatives are not made continuous, the jerk is still reduced. Thus, instead of equation (5), a different equation may be used to calculate $a_1$ to $a_6$. However, when both the first derivatives and the second derivatives are made continuous, the jerk is reduced more. It is, therefore, desirable that equation (5) be used ($a_1$ to $a_6$ be calculated by equation (1)).

The following equation (23) may be an example of the equation that can be used instead of equation (5).

[Math. 16]

$$y_k^{(1)}(0) = \frac{x(k+1) - x(k-1)}{2t_s} \quad (23)$$

If this equation (23) is used instead of equation (5), $a_1$ to $a_6$ are calculated by the following equation (24).

[Math. 17]

$$\begin{bmatrix} a_1 \\ a_2 \\ a_3 \\ a_4 \\ a_5 \\ a_6 \end{bmatrix} = \begin{bmatrix} 0 & 0 & 1 & 0 \\ 0 & -\frac{1}{2t_s} & 0 & \frac{1}{2t_s} \\ \frac{1}{2t_s^2} & -\frac{2}{2t_s^2} & \frac{1}{2t_s^2} & 0 \\ -\frac{3}{2t_s^3} & \frac{9}{2t_s^3} & -\frac{9}{2t_s^3} & \frac{3}{2t_s^3} \\ \frac{3}{2t_s^4} & -\frac{9}{2t_s^4} & \frac{9}{2t_s^4} & -\frac{3}{2t_s^4} \\ -\frac{1}{2t_s^5} & \frac{3}{2t_s^5} & -\frac{3}{2t_s^5} & \frac{1}{2t_s^5} \end{bmatrix} \cdot \begin{bmatrix} x(k-2) \\ x(k-1) \\ x(k) \\ x(k+1) \end{bmatrix} \quad (24)$$

REFERENCE SIGNS LIST

10 Servo driver
11 Interpolation function generation unit
12 Interpolation unit
13 Drive unit
21 Power circuit
22 Rectifier circuit
23 Smoothing capacitor
24 Inverter circuit
25 Current sensor
30 Higher-level apparatus
40 Motor
41 Encoder
50 Three-phase power supply

The invention claimed is:

1. A command value interpolation apparatus that interpolates a command value x(k) sequentially input (where k is an integer value indicating an order of input of the command value) at a predetermined cycle $t_s$, the command value interpolation apparatus comprising a processor configured with a program to perform operations for driving a servo driver, the operations comprising:

generating a kth interpolation function $y_k(t)$ in which function values at a start time $y_k(t=0)$ and an end time $y_k(t=t_s)$ of a kth time interval match a command value x(k) and a command value x(k+1), respectively, for each k value of greater than or equal to 1 in ascending order of k values; and repeating, in the ascending order of the k values, processing for calculating a plurality of command output values in the kth time interval by using the kth interpolation function $y_k(t)$, the command output values provided to the servo driver, wherein generating the kth interpolation function $y_k(t)$ comprises generating, on the basis of four command values comprising a command value x(k−2) to a command value x(k+1), the kth (where k≥3) interpolation function $y_k(t)$, the kth (where k≥3) interpolation function $y_k(t)$ is generated, using the four command values, as a fifth-order equation with respect to time such that function values at the start time $y_k(t=0)$ and the end time $y_k(t=t_s)$ of the kth time interval match a command value x(k) and a command value x(k+1), respectively, and the kth interpolation function $y_k(t)$ is generated such that a second derivative value of the generated kth interpolation function $y_k(t)$ at a start time of the kth time interval matches a second derivative value of a generated (k−1)th interpolation function $y_{k-1}(t)$ at an end time of a (k−1)th time interval, wherein the processor is configured with the program to perform operations such that;

generating, using the four command values, the kth (where k≥3) interpolation function $y_k(t)$ as the fifth-order equation with respect to time in which function values at the start time and the end time of the kth time interval match the command value x(k) and the command value x(k+1), respectively, comprises generating the kth interpolation function $y_k(t)$ such that a first derivative value and the second derivative value of the generated kth interpolation function $y_k(t)$ at the start time of the kth time interval respectively match a first derivative value and the second derivative value of the generated (k−1)th interpolation function $y_{k-1}(t)$ at the end time of the (k−1)th time interval;

generating, using the four command values, the kth (where k≥3) interpolation function $y_k(t)$ as the fifth-order equation comprises generating the fifth-order equation with respect to an elapsed time t from the start time of the kth time interval, by calculating coefficients $a_1$ to $a_6$ that satisfy an equation (1):

$$\begin{bmatrix} a_1 \\ a_2 \\ a_3 \\ a_4 \\ a_5 \\ a_6 \end{bmatrix} = \begin{bmatrix} 0 & 0 & 1 & 0 \\ \frac{1}{2t_s} & -\frac{4}{2t_s} & \frac{3}{2t_s} & 0 \\ \frac{1}{2t_s^2} & -\frac{2}{2t_s^2} & \frac{1}{2t_s^2} & 0 \\ -\frac{9}{2t_s^3} & \frac{27}{2t_s^3} & -\frac{27}{2t_s^3} & \frac{9}{2t_s^3} \\ \frac{11}{2t_s^4} & -\frac{33}{2t_s^4} & \frac{33}{2t_s^4} & -\frac{11}{2t_s^4} \\ -\frac{2}{t_s^5} & \frac{6}{t_s^5} & -\frac{6}{t_s^5} & \frac{2}{t_s^5} \end{bmatrix} \cdot \begin{bmatrix} x(k-2) \\ x(k-1) \\ x(k) \\ x(k+1) \end{bmatrix} \quad (1)$$

as zero-order to fifth-order coefficients, respectively.

2. The command value interpolation apparatus according to claim 1,
   wherein the processor is configured with the program to perform operations such that generating the kth interpolation function $y_k(t)$ comprises;
   performing processing for generating the kth (where k≥1 and ≥3) interpolation function $y_k(t)$ when a command value x(k+1) has been input, and
   repeating, in ascending order of k values, processing for calculating the plurality of command output values in the kth time interval comprises starting processing for calculating command output values in the kth time interval when the kth interpolation function $y_k(t)$ has been generated.

3. The command value interpolation apparatus according to claim 1, wherein the processor is configured with the program to perform operations such that generating the fifth-order equation with respect to an elapsed time t from the start time of the kth time interval, by calculating the coefficients $a_1$ to $a_6$ that satisfy the equation (1) comprises;
   generating a first interpolation function $y_k(t)$ that satisfies the equation (1), assuming that values of x(−1) and x(0) are (3·x(1)−2·x(2)) and (2·x(1)−x(2)), respectively, and
   generating a second interpolation function $y_k(t)$ that satisfies the equation (1), assuming that a value of x(0) is (2·x(1)−x(2)).

4. The command value interpolation apparatus according to claim 1, wherein the processor is configured with the program to perform operations such that generating the fifth-order equation with respect to an elapsed time t from the start time of the kth time interval, by calculating the coefficients $a_1$ to $a_6$ that satisfy the equation (1) comprises;
   generating a first interpolation function $y_k(t)$ that satisfies the equation (1), assuming that values of x(−1) and x(0) are both x(1) and,
   generating a second interpolation function $y_k(t)$ that satisfies the equation (1), assuming that a value of x(0) is x(1).

5. The command value interpolation apparatus according to claim 1, wherein, in a case in which a command value x(k+1) is not input at input timing at which the command value x(k+1) (k≥3) is supposed to be input, the processor is configured with the program to perform operations such that repeating, in ascending order of k values, processing for calculating the plurality of command values in the kth time interval comprises calculating command values in a kth time interval by using a (k−1)th interpolation function $y_{k-1}(t)$.

6. The command value interpolation apparatus according to claim 1, wherein, in a case in which a command value x(k+1) is not input at input timing at which the command value x(k+1) (k≥3) is supposed to be input, the processor is configured with the program to perform operations such that repeating, in ascending order of k values, processing for calculating the plurality of command values in the kth time interval comprises estimating a command value x(k+1) by using a (k−1)th interpolation function $y_{k-1}(t)$ and generating a kth interpolation function $y_k(t)$ by using the estimated command value x(k+1).

7. A servo driver that drives a servo motor on the basis of a command value x(k) sequentially input (where k is an integer value indicating an order of input of the command value) at a predetermined cycle $t_s$, and a command output value, the servo driver comprising:
   a power circuit configured to drive the servo motor;
   a processor coupled to the power circuit and configured with a program to perform operations comprising:
   generating, upon input of a command value x(k+1) (k≥1), a kth interpolation function $y_k(t)$ in which function values at a start time $y_k(t=0)$ and an end time $y_k(t=t_s)$ of a kth time interval match a command value x(k) and a command value x(k+1), respectively;
   calculating a plurality of command output values in the kth time interval by using the generated kth interpolation function $y_k(t)$; and
   controlling the power circuit on the basis of each command output value of the calculated plurality of command output values, wherein
   generating, upon input of the command value x(k+1) (k≥1), the kth interpolation function $y_k(t)$ comprises generating, on the basis of four command values comprising a command value x(k−2) to a command value x(k+1), the kth (where k≥3) interpolation function $y_k(t)$,
   the kth (where k≥3) interpolation function $y_k(t)$ is generated, using the four command values, as a fifth-order equation with respect to time such that function values at the start time $y_k(t=0)$ and the end time $y_k(t=t_s)$ of the kth time interval match a command value x(k) and a command value x(k+1), respectively, and
   the kth interpolation function $y_k(t)$ is generated such that a second derivative value of the generated kth interpolation function $y_k(t)$ at a start time of the kth time interval matches a second derivative value of a generated (k−1)th interpolation function $y_{k-1}(t)$ at an end time of a (k−1)th time interval; and
   generating, using the four command values, the kth (where k≥3) interpolation function $y_{k(t)}$ as the fifth-order equation comprises generating the fifth-order equation with respect to an elapsed time t from the start time of the kth time interval, the fifth-order equation including by calculating coefficients $a_1$ to $a_6$ that satisfy an equation (1):

$$\begin{bmatrix} a_1 \\ a_2 \\ a_3 \\ a_4 \\ a_5 \\ a_6 \end{bmatrix} = \begin{bmatrix} 0 & 0 & 1 & 0 \\ \frac{1}{2t_s} & -\frac{4}{2t_s} & \frac{3}{2t_s} & 0 \\ \frac{1}{2t_s^2} & -\frac{2}{2t_s^2} & \frac{1}{2t_s^2} & 0 \\ -\frac{9}{2t_s^3} & \frac{27}{2t_s^3} & -\frac{27}{2t_s^3} & \frac{9}{2t_s^3} \\ \frac{11}{2t_s^4} & -\frac{33}{2t_s^4} & \frac{33}{2t_s^4} & -\frac{11}{2t_s^4} \\ -\frac{2}{t_s^5} & \frac{6}{t_s^5} & -\frac{6}{t_s^5} & \frac{2}{t_s^5} \end{bmatrix} \cdot \begin{bmatrix} x(k-2) \\ x(k-1) \\ x(k) \\ x(k+1) \end{bmatrix} \quad (1)$$

as zero-order to fifth-order coefficients, respectively.

8. A command value interpolation apparatus that interpolates a command value x(k) sequentially input (where k is an integer value indicating an order of input of the command value) at a predetermined cycle $t_s$, the command value interpolation apparatus comprising a processor configured with a program to perform operations for driving a servo driver, the operations comprising:

generating a kth interpolation function $y_k(t)$ in which function values at a start time $y_k(t=0)$ and an end time $y_k(t=t_s)$ of a kth time interval match a command value $x(k)$ and a command value $x(k+1)$, respectively, for each k value of greater than or equal to 1 in ascending order of k values; and repeating, in the ascending order of the k values, processing for calculating a plurality of command output values in the kth time interval by using the kth interpolation function $y_k(t)$, the command output values provided to the servo driver, wherein generating the kth interpolation function $y_k(t)$ comprises generating, on the basis of four command values comprising a command value $x(k-2)$ to a command value $x(k+1)$, the kth (where $k \geq 3$) interpolation function $y_k(t)$, as a fifth-order equation with respect to time such that function values at the start time $y_k(t=0)$ and the end time $y_k(t=t_s)$ of the kth time interval match a command value $x(k)$ and a command value $x(k+1)$, respectively, the kth interpolation function $y_k(t)$ is generated such that a first derivative and a second derivative value of the generated kth interpolation function $y_k(t)$ at a start time of the kth time interval matches a first derivative and a second derivative value of a generated (k−1)th interpolation function $y_{k-1}(t)$ at an end time of a (k−1)th time interval, and generating, using the four command values, the kth (where $k \geq 3$) interpolation function $y_k(t)$ as the fifth-order equation comprises generating the fifth-order equation with respect to an elapsed time t from the start time of the kth time interval, by calculating coefficients $a_1$ to $a_6$ that satisfy an equation (24):

$$\begin{bmatrix} a_1 \\ a_2 \\ a_3 \\ a_4 \\ a_5 \\ a_6 \end{bmatrix} = \begin{bmatrix} 0 & 0 & 1 & 0 \\ 0 & -\dfrac{1}{2t_s} & 0 & \dfrac{1}{2t_s} \\ \dfrac{1}{2t_s^2} & -\dfrac{2}{2t_s^2} & \dfrac{1}{2t_s^2} & 0 \\ -\dfrac{3}{2t_s^3} & \dfrac{9}{2t_s^3} & -\dfrac{9}{2t_s^3} & \dfrac{3}{2t_s^3} \\ \dfrac{3}{2t_s^4} & -\dfrac{9}{2t_s^4} & \dfrac{9}{2t_s^4} & -\dfrac{3}{2t_s^4} \\ -\dfrac{1}{2t_s^5} & \dfrac{3}{2t_s^5} & -\dfrac{3}{2t_s^5} & \dfrac{1}{2t_s^5} \end{bmatrix} \cdot \begin{bmatrix} x(k-2) \\ x(k-1) \\ x(k) \\ x(k+1) \end{bmatrix} \quad (24)$$

as zero-order to fifth-order coefficients, respectively.

\* \* \* \* \*